US012439108B2

(12) United States Patent
Ziai et al.

(10) Patent No.: US 12,439,108 B2
(45) Date of Patent: Oct. 7, 2025

(54) VIDEO CLIP LEARNING MODEL

(71) Applicant: Netflix, Inc., Los Gatos, CA (US)

(72) Inventors: Amirreza Ziai, Menlo Park, CA (US); Shervin Ardeshir Behrostaghi, Campbell, CA (US); Eugene Lok, Los Angeles, CA (US)

(73) Assignee: Netflix, Inc., Los Gatos, CA (US)

( * ) Notice: Subject to any disclaimer, the term of this patent is extended or adjusted under 35 U.S.C. 154(b) by 110 days.

(21) Appl. No.: 18/408,325

(22) Filed: Jan. 9, 2024

(65) Prior Publication Data

US 2025/0227316 A1 Jul. 10, 2025

(51) Int. Cl.
   *H04N 21/25* (2011.01)
   *G06V 20/40* (2022.01)
   *H04N 21/234* (2011.01)
   *H04N 21/8549* (2011.01)

(52) U.S. Cl.
   CPC ........... *H04N 21/251* (2013.01); *G06V 20/48* (2022.01); *H04N 21/23418* (2013.01); *H04N 21/8549* (2013.01)

(58) Field of Classification Search
   None
   See application file for complete search history.

(56) References Cited

U.S. PATENT DOCUMENTS

| | | | |
|---|---|---|---|
| 10,455,297 B1 | 10/2019 | Mahyar | |
| 2007/0288965 A1* | 12/2007 | Murakami | H04N 21/4663 |
| | | | 725/46 |
| 2011/0225608 A1* | 9/2011 | Lopatecki | H04N 21/2668 |
| | | | 725/34 |
| 2013/0227597 A1* | 8/2013 | Baskaran | H04N 21/44224 |
| | | | 725/14 |
| 2014/0101686 A1* | 4/2014 | Kitts | H04N 21/812 |
| | | | 725/14 |
| 2015/0149583 A1* | 5/2015 | Chung | H04L 67/10 |
| | | | 709/217 |
| 2017/0055014 A1 | 2/2017 | Bou Balust | |
| 2021/0144442 A1 | 5/2021 | Liu | |
| 2023/0260284 A1 | 8/2023 | Balannik | |

OTHER PUBLICATIONS

International Search Report and Written Opinion for International Application No. PCT/US2025/010701, mailed Apr. 7, 2025; 23 pages.
Sun et al., "Ranking Domain-Specific Highlights by Analyzing Edited Videos", ECCV Switzerland, 2014, pp. 787-802; 16 pages.

* cited by examiner

*Primary Examiner* — James R Marandi
(74) *Attorney, Agent, or Firm* — Greenberg Traurig, LLP

(57) ABSTRACT

A computer-implemented method may include accessing a video clip associated with a media item and comparing the accessed video clip to various previously selected video clips that have been used to promote each clips' corresponding media item. The method, upon determining that the accessed video clip is sufficiently similar to a specified video clip, may also include accessing a take fraction value associated with the specified video clip that indicates how well the specified video clip has correlated to user views of the associated media item. Then, based on the association between the specified video clip and the take fraction value, the method may include training a machine learning model to predict a video clip take fraction value for the accessed video clip indicating how well the video clip will correlate to user views of the media item. Various other methods, systems, and computer-readable media are also disclosed.

20 Claims, 7 Drawing Sheets

VIDEO CLIP LEARNING MODEL

BACKGROUND

Movies and other media items often have trailers, intros, or short video clips associated with them. These video clips typically serve to entice people to view the underlying media item. Short video clips, for example, are often shown while a user hovers over a selection in a media streaming user interface. In some cases, these video clips may provide information about the media item (e.g., a movie or television show), including an indication of which actors or actresses are in the movie, which genre the movie falls into, who directed the movie, or other kinds of information.

In some cases, specific video clips from the movie may be selected to advertise the associated movie or tv show. However, each media item may include many different clips, potentially from different points in the movie or from different episodes in a tv show. Each of these video clips may have a different appeal to potential audiences. The amount and different types of available video clips may overwhelm human users that are tasked with trying to identify suitable video clips from a wide range of available clips taken from the media item.

SUMMARY

As will be described in greater detail below, the present disclosure describes systems and methods for predicting video clip performance for video clips and their corresponding media items.

In some embodiments, the techniques described herein relate to a computer-implemented method that may include: accessing at least one video clip associated with a media item, comparing the accessed video clip to one or more previously selected video clips that have been used to promote each clips' corresponding media item, upon determining that the accessed video clip is sufficiently similar to at least one specified video clip of the previously selected video clips, accessing a take fraction value associated with the specified video clip that indicates how well the specified video clip has correlated to user views of the associated media item, and based at least on the association between the specified video clip and the take fraction value, training a machine learning (ML) model to predict a video clip take fraction value for the accessed video clip indicating how well the accessed video clip will correlate to user views of the media item.

In some cases, the method may further include accessing an unprocessed video clip associated with a new media item that has not been processed by the trained ML model, and implementing the trained ML model to predict a take fraction value for the unprocessed video clip to indicate how well the unprocessed video clip will correlate to user views of the new, unprocessed media item. In some cases, the method may further include tracking, as feedback, how well the unprocessed video clip correlated to views of the associated media item and incorporating the feedback in the ML model when accessing future video clips and predicting future video clip take fraction values.

In some examples, the method may further include changing a selected video clip for at least one media item based on the incorporated feedback. In some embodiments, comparing the accessed video clip to one or more previously selected video clips may include identifying and matching patterns or audio/video characteristics that are present in the accessed video clip and in the previously selected video clips.

In some cases, the method may further include filtering video clips that are to be processed by the ML model to ensure that the video clips are usable by the ML model. In some examples, the video clip take fraction value may indicate a percentage of views of the associated media item relative to a number of impressions of the accessed video clip. In some embodiments, the ML model may include a deep learning model that is configured to analyze a plurality of video clips and a corresponding plurality of video clip take fraction values to indicate how well the plurality of video clips correlates to views of the associated media items.

In some examples, the method may further include ranking each of the plurality of video clips based on the predicted video clip take fraction values. In some cases, the video clip take fraction value may include, as a factor, an amount of time spent watching the media item. In some examples, the video clip take fraction value may include, as a factor, a property associated with the media item. In some embodiments, edited versions of the accessed video clip may result in different video clip take fraction values for the associated media item. In some cases, the ML model may be configured to process the edited versions of the accessed video clip as separate video clips that are each associated with the media item.

In some examples, the method may further include adding one or more timecodes to the accessed video clip to adjust the length of the video clip. In some embodiments, the accessed video clip may include at least one of a scene or a shot determined by respective scene boundaries or shot boundaries. In some cases, the accessed media item may have a plurality of corresponding video clips, and a personalized video clip may be presented to a user to entice views of the media item. In some embodiments, a plurality of video clips may be stitched together to provide a single, longer video clip. In some cases, a random video clip may be selected over a highly ranked video clip for presentation to a user.

In some aspects, the techniques described herein relate to a system including: at least one physical processor and physical memory including computer-executable instructions that, when executed by the physical processor, cause the physical processor to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

In some aspects, the techniques described herein relate to a non-transitory computer-readable medium including one or more computer-executable instructions that, when executed by at least one processor of a computing device, cause the computing device to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
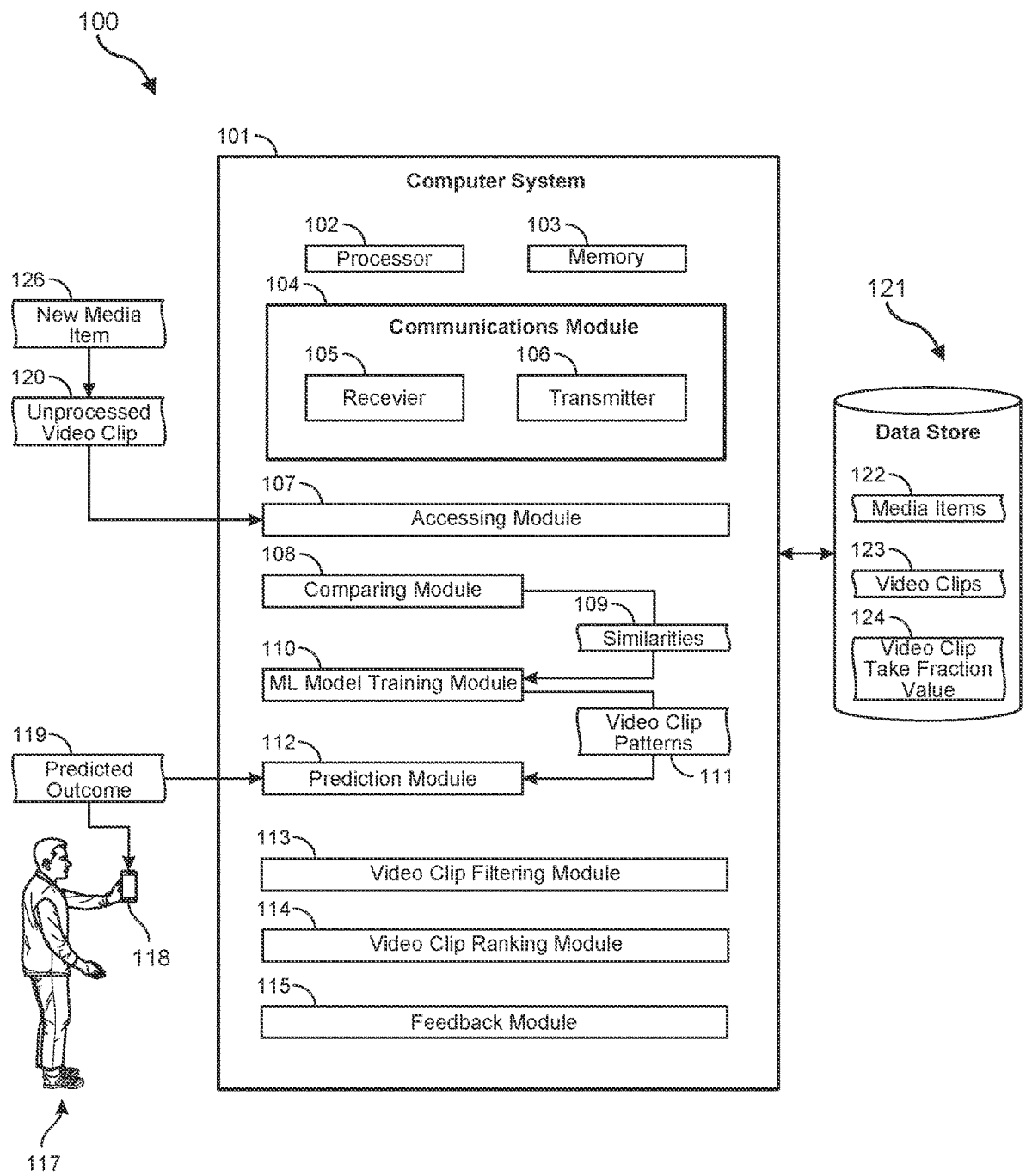
FIG. 1 illustrates a computing architecture in which embodiments of the disclosure may be performed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to predicting video clip performance for media item video clips and their corresponding media items. As noted above, video clips are often taken from media items such as movies to advertise or provide information about those movies. For example, a movie that stars a specific actor or actress may use a video clip of that actor or actress from within the movie to advertise that film. These video clips are intended to attract viewers to click "play" on a title within a media streaming service. The video clips may be implemented in streaming service selection menus, in promotional materials associated with a movie or tv show, or in other scenarios with other types of media items.

In some cases, in video streaming services, these video clips may be referred to as "hook clips." Hook clips are intended to "hook" the user into watching the underlying movie or tv show. The video clips may include action scenes, dramatic scenes, visual landscape scenes, intense dialogue scenes, or other clips from the media item that would attract a user to that media item and ultimately entice the user to play back the media item. The number of times a given title is played is often referred to as the number of "views" the media item has received. Video clips are typically selected or intentionally designed or edited to increase the number of views associated with a given title. Historically, however, human users who select the video clips used with media items may struggle with the large number of video clips available, as well as the different types of video clips that may appeal to different audiences in a media streaming service.

The embodiments described herein present systems and methods that are designed to increase the number of views for a given media item. As will be explained in greater detail below, these systems and methods may implement multiple different techniques, either alone or in combination, to create or select video clips that are better at driving views to the video clip's underlying media item. These systems and methods may, at a high level, filter and retrieve video clips that are suitable for presentation as hook clips, may identify patterns in the retrieved video clips to rank those video clips based on which is most likely to increase the number of views of the associated media item, and may provide the ranked video clips to editors or other users for editing and/or final approval. While many of the embodiments described herein will reference movies and television shows, it will be understood that the principles, systems, and algorithms described herein may be implemented to extract, filter, and rank video clips in substantially any context where video clips of any type are to be identified and selected for a specific purpose. These embodiments will be described in greater detail below with regard to FIGS. 1-7.

FIG. 1, for example, illustrates a computing architecture 100 in which specified video clips may be identified and used as hook clips for a corresponding media item. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes an accessing module 107. The accessing module may be configured to access media items 122 including movies, television shows, online videos, or other types of media items. Each of these media items 122 may include corresponding video clips 123. The video clips 123 may represent short sections of a movie or television show, for example. While the video clips 123 may be substantially any length, many of the video clips may be between 1-5 minutes in length. In some cases, the video clips 123 may align with the beginning and ending of scenes in the media item, while in other cases, the video clips may align with video shots (e.g., close-up shots, landscape shots, opening shots, etc.). In some embodiments, the video clips 123 stored in data store 121 may have already been processed and may have been stored in the data store for later use. The unprocessed video clips 120 may be video clips taken from a new media item 126 that has not yet been processed by the computer system 101.

The computer system 101 may further include a comparing module 108. The comparing module may be configured to compare a specific video clip to one or more previous video clips 123. This comparison process may include analyzing the previous video clips 123 for patterns and then determining whether the specified video clip shares some or all of those patterns. For instance, some of the previous video clips 123 that have been used in conjunction with their underlying media items to advertise or provide information about those media items may include car chases, first fights, or explosions indicating an action scene, or may include sustained dialogue, close-up facial shots of an actor/actress, or actions that would indicate a dramatic scene, or may include other types of scenes or video shots that would indicate genre, style, type, or other indicators of a movie's substance or characteristics.

These patterns and indicators may be applied to the specified video clip to determine whether that clip includes any of the patterns or indicators shared by the previous video clips 123. If so, the comparing module 108 may indicate, based on the identified similarities 109, that the specified clip may be suitable for use as a hook clip in conjunction with that media item. At least in some cases, these similarities may include "features" or "variables" extracted from different modalities (e.g., audio, video, text, etc.). These extracted features may then be provided to an ML model to be used in ML training and inference processes, as will be explained further below.

As noted above, a "video clip take fraction" or "video clip take fraction value" 124 may represent the number of successful streams of a media item relative to the number of impressions of that media item (e.g., the number of people that select the media item in relation to the number of people that view some or all of the video clip). Additionally or alternatively, the video clip take fraction value 124 may indicate the number of users that "liked" the media item (or otherwise indicated interest in the media item) relative to the number of impressions. The higher the ratio in the video clip take fraction value 124, the better the video clip is at drawing views. The data store 121 may store many thousands or millions of video clips (or more), along with calculated, corresponding video clip take fraction values 124. These video clip take fraction values 124 may indicate, for each video clip/media item pair, how well the video clip performed at drawing views, likes, or other indications of interest to the media item from which the video clip was taken.

Computer system 101 may further include a machine learning (ML) model training module 110. The ML model training module 110 may be configured to train an ML model to identify video clips that are likely to perform well in drawing users to view a given media item. The ML model may take, as input, the stored media items 122 and their corresponding video clips 123, along with any associations between the media item and the corresponding video clip (e.g., a video clip take fraction value 124 that indicates a video clip's performance at driving views of the media item). As will be explained further below, the ML model may analyze many thousands or millions of video clips and associated media items and may isolate patterns in video clips that have performed well in driving views for their underlying media items. These video clip patterns 111 may indicate that a given video clip will or will not be a valuable hook clip or, stated differently, that a video clip will or will not have a high video clip take fraction value 124 relative to its underlying media item 122.

The prediction module 112 of computer system 101 may implement the trained ML model to generate a predicted outcome 119 such as a predicted video clip take fraction value 124. This predicted outcome 119 may be provided to a user 117, to a user's electronic device 118, and/or to other entities or devices. The prediction may specify, for a new, unprocessed video clip 120 that has not previously been processed by the trained ML model, the most likely video clip take fraction value for that video clip and the new media item 126. These and other embodiments will be described in greater detail below with regard to Method 200 of FIG. 2 and with continued reference to computing architecture 100 of FIG. 1.

Figure 2:
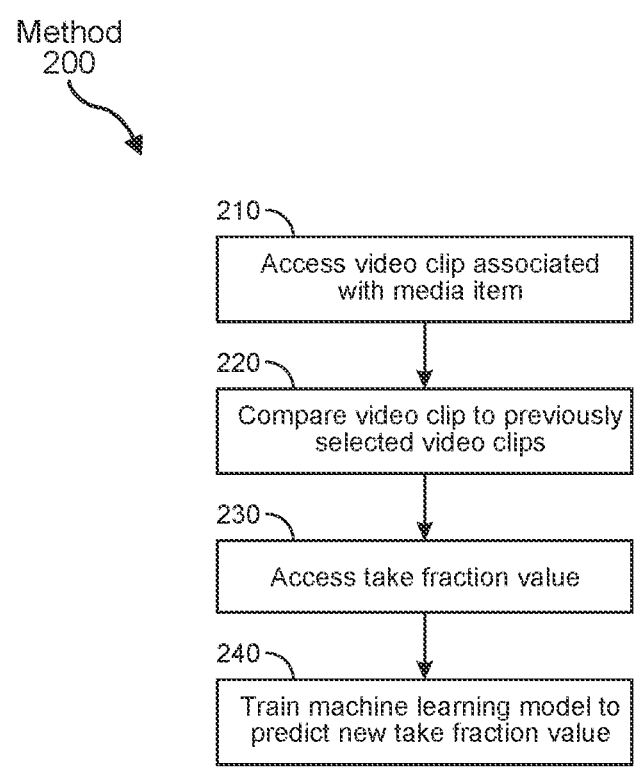
FIG. 2 illustrates a flow diagram of a method for predicting video clip performance for video clips and their underlying media items.

FIG. 2 is a flow diagram of an exemplary computer-implemented method 200 for predicting video clip performance for media item video clips and their underlying media items. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, the method 200 may include accessing at least one video clip associated with a media item. At step 220, the method 200 may include comparing the accessed video clip to one or more previously selected video clips that have been used to promote each clips' corresponding media item. Then, step 230 may include, upon determining that the accessed video clip is sufficiently similar to at least one specified video clip of the previously selected video clips, accessing a take fraction value associated with the specified video clip that indicates how well the specified video clip has correlated to user views of the associated media item. Step 240 of method 200 may include, based at least on the association between the specified video clip and the take fraction value, training a machine learning (ML) model to predict a video clip take fraction value for the accessed video clip indicating how well the accessed video clip will correlate to user views of the media item.

Figure 3:
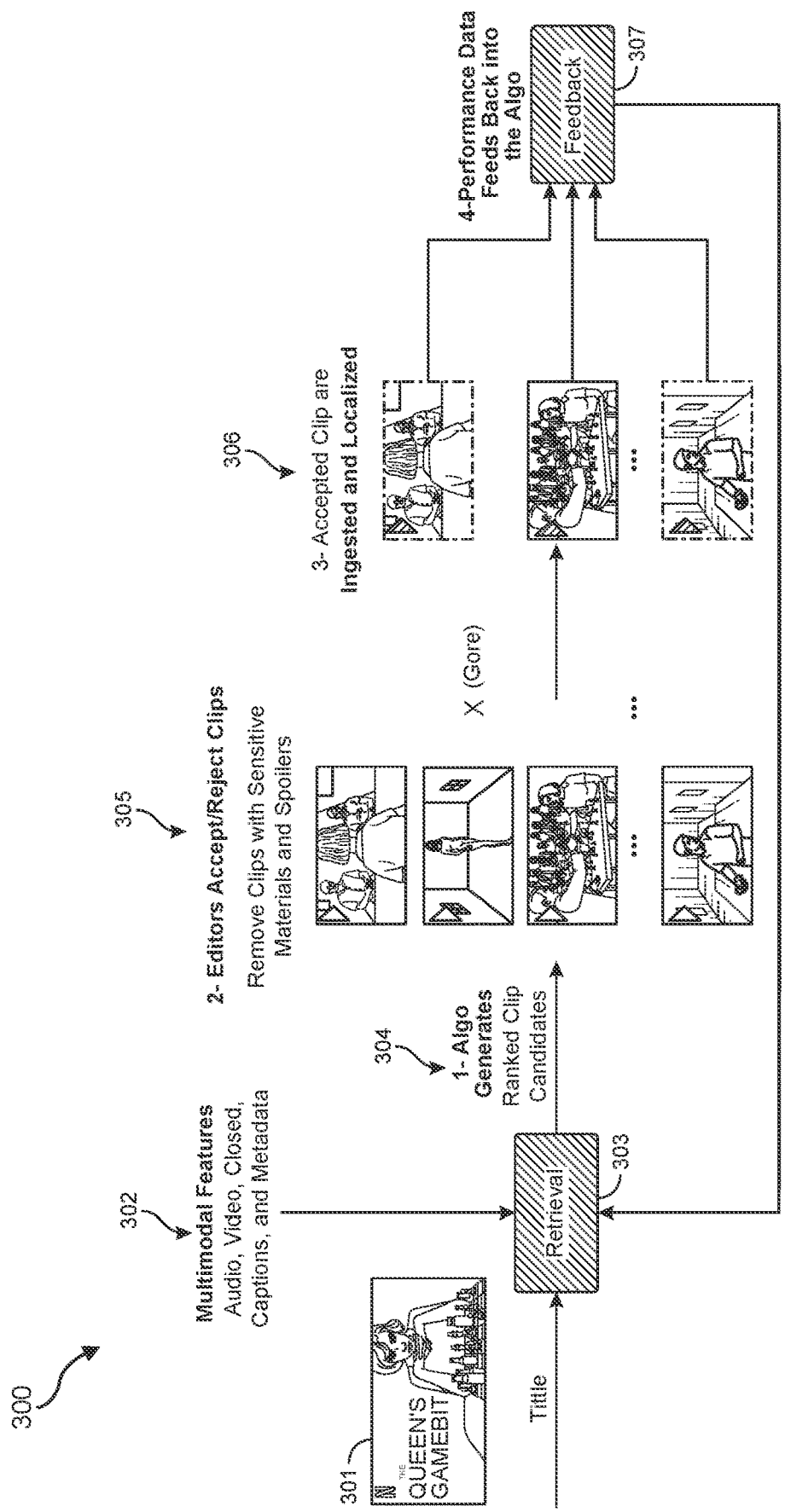
FIG. 3 illustrates an alternative computing architecture in which embodiments of the disclosure may be performed including identifying features, accepting or rejecting video clips, ingesting and localizing clips, and providing system feedback.

FIG. 3 illustrates a computing architecture 300 in which the method 200 of FIG. 2 may operate. In the computing architecture 300, a retrieval algorithm 303 may be configured to access various video clips. In the example of FIG. 3, the retrieval algorithm 303 may be configured to access video clips from a video 301 entitled "Queen's Gambit." The retrieval algorithm 303 may additionally access multiple other video clips and associated take fraction values that are based on other media items that have previously been analyzed. The previous analysis may indicate, for each video clip, how well that video clip performed at getting users to select and view the corresponding media item.

Those video clip and take fraction pairs may be used by a ranking algorithm 304 to train an ML model to recognize which video clips are most likely to perform well at attracting views. The ML model may be trained to recognize which patterns lead to higher video clip take fraction values (e.g., patterns showing a main character, or patterns showing a specific genre or style (action or western), or patterns showing an overall tone of the media item, or other types of patterns). The ranking algorithm 304 may then use this trained ML model to analyze the video clips received from the video 301 and rank the video clips based on their calculated take fraction value.

In some cases, the retrieval algorithm 303 may implement various types of media item features to create the video clips. At least in some embodiments, these features may be referred to as "multimodal features" 302 as they represent multiple different types of media item features or characteristics. For instance, the multimodal features 302 may include audio features (e.g., indicating when a scene has begun or ended, or indicating when a specific actor or actress is speaking, etc.), video features (e.g., indicating when a scene or video shot has begun or ended, indicating what type of shot is being used, indicating the content and/or genre of the scene, etc.), closed captions (e.g., indicating which dialogue is being said or when the dialogue begins or ends), metadata (e.g., indicating lists of actors or actresses, indicating genre, indicating overall runtime, indicating A/V characteristics, or other information), or any other explicit features or implicit features that may be derived from different characteristics of the media item. Any or all of these multimodal features 302 may be used by the retrieval algorithm 303 when accessing or generating video clips. As noted above, the ranking algorithm 304 may then rank these video clips based on their associated video clip take fraction values, which may be predicted or may be based on previously obtained empirical data associated with the video clip/media item pair.

The ranked video clips may then be provided to an editor or other user at 305. The editors may view the video clips and may either approve the clips for use in conjunction with the media item or reject the video clips and prevent the video clips from being used on the streaming (or other) platform. In some cases, the editors may reject the video clips for including sensitive material (e.g., gore, nudity, sex, adult language, spoilers, or other scenes that would not be appropriate for certain audiences). At 306, the video clips that were approved may be added to the streaming platform for distribution. At least in some cases, the approved video clips may be localized by changing languages, adding dubbing, changing box art, modifying the start time or end time of the clip (i.e., adjusting the length of the clip) or making other changes to bring the video clips in line with local customs or norms.

At 307, the system may monitor how well the selected video clips perform as hook clips and may provide feedback. Video clips that, upon being viewed, are more often successful at drawing the views of the underlying media item may have a higher take fraction value and may be promoted over video clips that, when viewed, result in a lower take fraction value. At least in some cases, the feedback indicating which video clips performed the best at driving views may be used to identify patterns in the top-performing video clips and may be used to dynamically update the ML model to better recognize which future video clips will lead to the most views of the underlying media item. This process is illustrated in further detail in FIG. 4.

Figure 4:
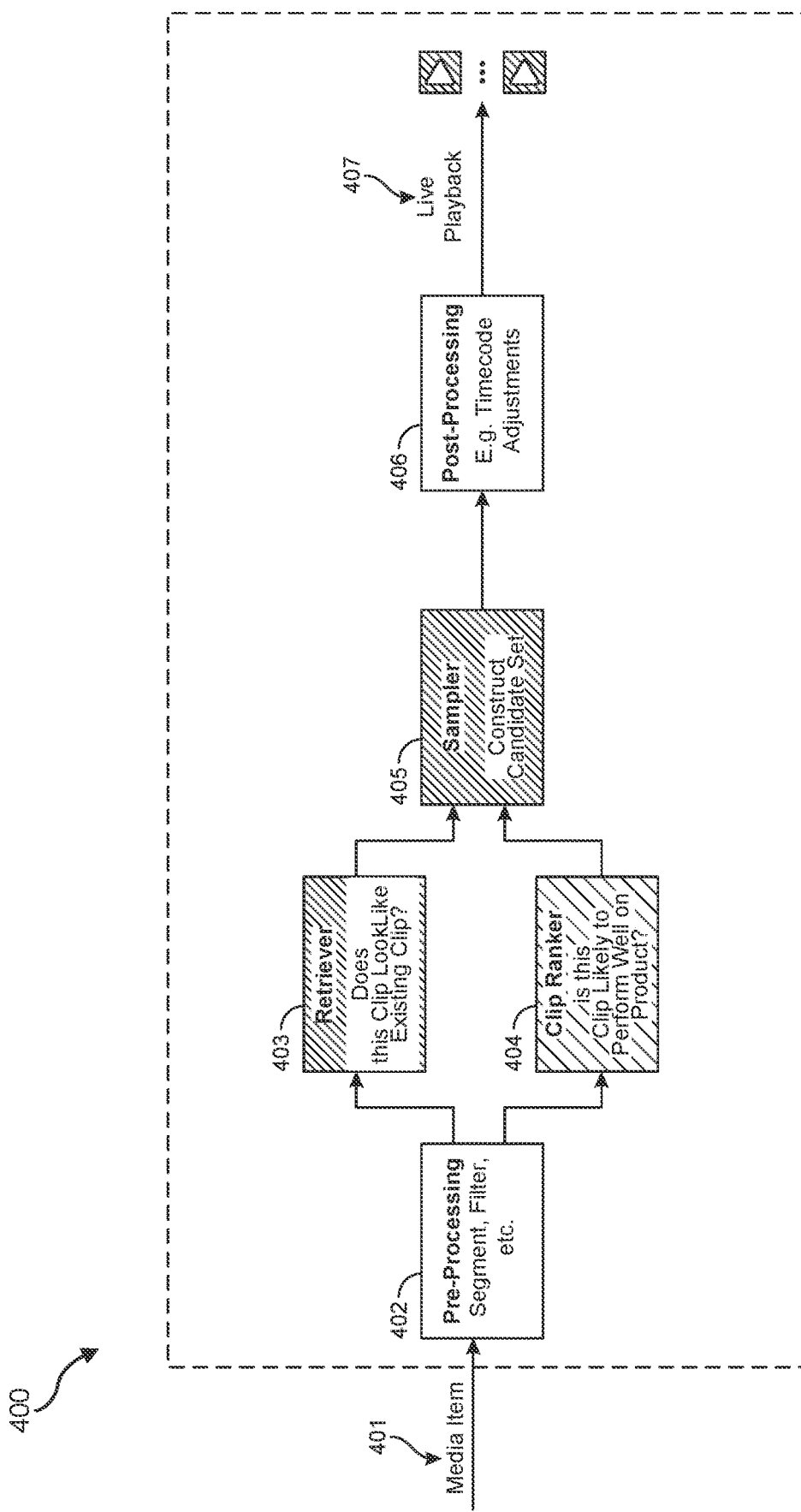
FIG. 4 illustrates an alternative computing architecture in which embodiments of the disclosure may be performed including preprocessing, retrieving, ranking, sampling, and processing video clips for implementation in a streaming interface.

FIG. 4 illustrates an alternative computing architecture 400 that includes various software, hardware, or firmware modules that are configured to perform different functions. In some cases, the embodiment shown in FIG. 4 may represent a video clip learning model (VCLM). At least in some cases, the VCLM may include a pre-processing module 402 that takes an input media item (e.g., 401, which may be identified by a television season identifier or a movie title) and segments the media item into different video clips. These clips may be based on shots, scenes, timestamps (e.g., from 3:30-5:45 or from 1:10:05-1:15:53), or other differentiators. The pre-processing module 402 may also perform filtering to remove video clips that have sensitive content (e.g., spoilers or adult content) or other content that would not be advisable to include in a hook clip for general consumption.

The computing architecture 400 may also include a retriever module 403, a video clip ranker 404, a sampler 405, and a post-processing module 406. The retriever 403 may be configured to access video clips that have already passed the sensitive content filter and have been segmented into clips. Some of these clips may include a single, contiguous segment of the movie or tv show that runs from one to five minutes, for instance. Other clips may include two or more non-contiguous segments that have been joined together to create a single hook clip. In such cases, a video clip from 4:03-6:10 may be joined with another clip from 19:36-22:04 from the same movie or tv show. In some instances, video clips may be joined to other clips out of order (that is, in a different order from the original encoding). Thus, editors or other users may have the freedom to join clips as desired to create personalized hook clips that are designed for specific users or specific types of users.

In some embodiments, the retriever 403 may not only access video clips that have passed the filtering process but may also be configured to access video clips that are predicted to pass the filtering process. Such clips may not yet have been analyzed and filtered by the pre-processing module 402 but may be analyzed and predicted by the retriever module 403 to pass the filtering process based on identified similarities to other, existing video clips that have been approved and used as hook clips. Those video clips that are predicted to pass the filtering process may also be provided to the video clip ranker 404 in addition to those clips that have passed the initial filtering process.

The video clip ranker 404 may receive those video clips from the retriever 403 that have either passed the filtering process or have been predicted to pass the filtering process. The ranker 404 may rank the received video clips based on their likelihood to perform well at driving views to the media item 401. As noted above, the video clip ranker 404 may, itself, be a machine learning model, an inferential model, a deep learning model, a neural network, or other similar type of model, or may have access to such a model running on a different platform or computing system. These models may include special-purpose processors, including machine learning processors. An ML processor, for example, may be a dedicated, special-purpose processor with logic and circuitry designed to perform machine learning. The ML processor may work in tandem with a feedback implementation module to access data and use feedback to train an ML model. For instance, the ML processor may access one or more different training data sets. The ML processor and/or the feedback implementation module may use these training data sets to iterate through positive and negative samples and improve the ML model over time.

In some cases, the machine learning model may include an inferential model. As used herein, the term "inferential model" may refer to purely statistical models, purely machine learning models, or any combination of statistical and machine learning models. Such inferential models may include neural networks such as recurrent neural networks or fully connected neural networks (e.g., a multi-layer perceptron). In some embodiments, the recurrent neural network may be a long short-term memory (LSTM) neural network. Such recurrent neural networks are not limited to LSTM neural networks and may have any other suitable architecture. For example, in some embodiments, the neural network may be a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used. In some implementations, the inferential model may be an unsupervised machine learning model, e.g., where previous data (on which the inferential model was previously trained) is not required.

At least some of the embodiments described herein may include training a neural network to identify data dependencies, identify which information from various data sources is to be altered to lead to a desired outcome or how to alter the information to lead to a desired outcome. In some embodiments, the systems described herein may include a neural network that is trained to identify how information is to be altered using different types of data and associated data dependencies. For example, the embodiments herein may use a feedforward neural network. In some embodiments, some or all of the neural network training may happen offline. Additionally or alternatively, some of the training may happen online. In some examples, offline development may include feature and machine learning model development, training, and/or test and evaluation.

Once the machine learning model has been trained, the ML model may be used to identify which data is to be altered and how that data is to be altered based on multiple different data sets. In some embodiments, the machine learning model that makes these determinations may be hosted on different cloud-based distributed processors (e.g., ML processors) configured to perform the identification in real time or substantially in real time. Such cloud-based distributed processors may be dynamically added, in real time, to the process of identifying data alterations. These cloud-based distributed processors may work in tandem with a prediction module to generate outcome predictions, according to the various data inputs.

These predictions may identify potential outcomes that would result from the identified data alterations. The predictions output by the prediction module may include associated probabilities of occurrence for each prediction. The prediction module may be part of a trained machine learning model that may be implemented using the ML processor. In some embodiments, various components of the machine learning module may test the accuracy of the trained machine learning model using, for example, proportion estimation. This proportion estimation may result in feedback that, in turn, may be used by the feedback implementation module in a feedback loop to improve the ML model and train the model with greater accuracy.

Thus, regardless of which type of machine learning or other model is used, the VCLM algorithm (and, specifically, the video clip ranker 404) may train using past usage data. The past data, in this implementation, may include other video clips that were taken from underlying media items and used as video clips for those media items. The video clips may then be provided in a streaming platform media selection UI where users can select media items for streaming. Indeed, the sampler 405 may construct a candidate set of video clips that could potentially be used as hook clips for an underlying media item. This candidate set of video clips may then be edited by a human user or may be filtered by the sampler 405 to include clips that are ranked sufficiently high, based on the calculated video clip take fraction value, and clips that are unlikely (or known not) to include sensitive content.

In some cases, the pared-down set of candidate video clips may then be prepared for use as hook clips in a multimedia streaming interface. This preparation may include post-processing by the post-processing module 406. The post-processing may include making timecode adjustments to the hook clip or performing other editing or touchups. These candidate clips may then be used by the system's recommendation algorithm to surface the clips as hook clips for live playback 407 to advertise the underlying media item. In some embodiments, the system may then track how well each of the video clips fared as hook clips by tracking how many times the corresponding media items were selected after viewing of the clips. The tracking may also note the amount of time each media item was streamed and/or other indicators of interest (e.g., likes or shares).

Figure 5:
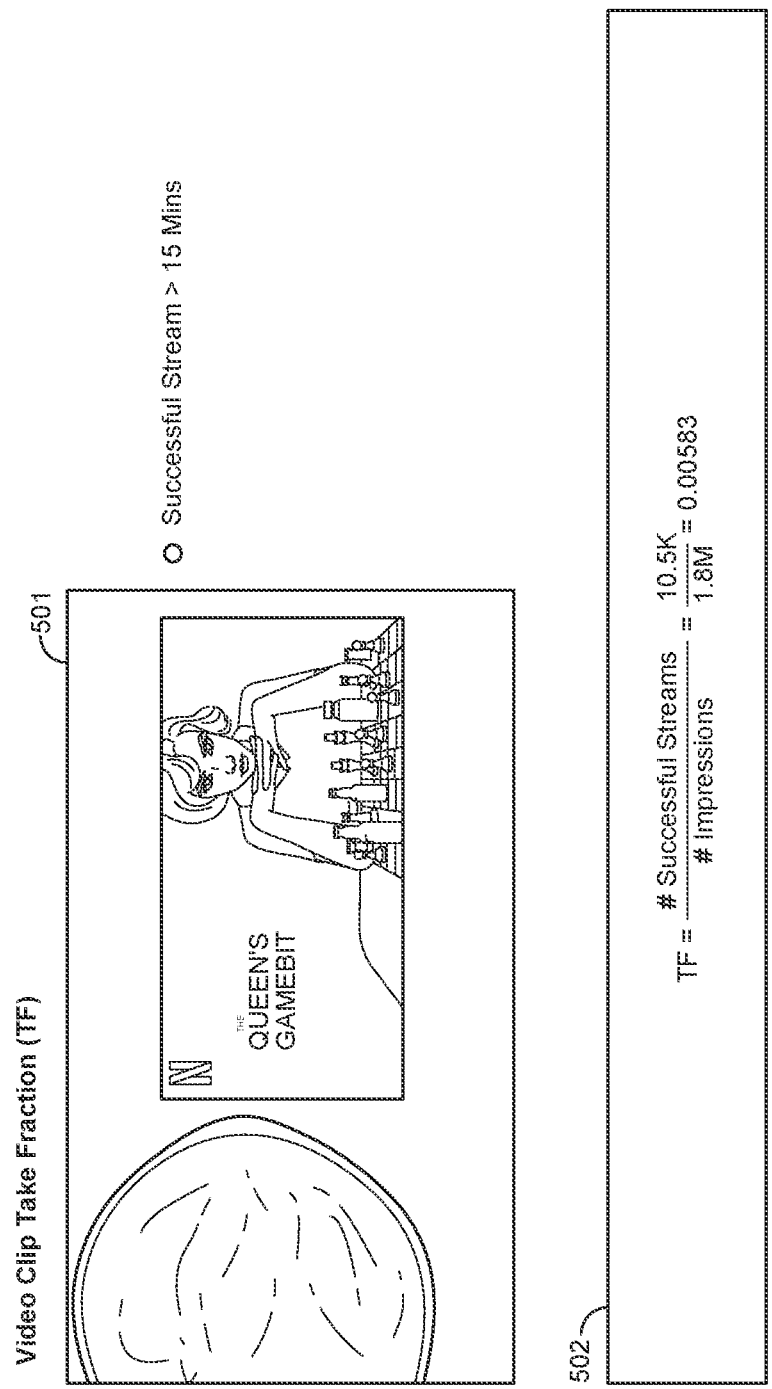
FIG. 5 illustrates a computing architecture in which embodiments of the disclosure may be performed including calculating a video clip take fraction value.

FIG. 5, for instance, illustrates an embodiment in which a video clip take fraction value 502 is calculated for a media item 501. When calculating the take fraction value 502, the system may take into account how long the media item 501 was streamed (i.e., the duration of the stream). In some cases, a "successful" stream may be one of at least a minimum length (e.g., >15 minutes, >20 minutes, >30 minutes). In other cases, the minimum length may not be used or may be smaller (e.g., >5 min.). In some cases, a "successful" stream may be based on the proportion of the media item that was watched (e.g., 20% of the duration of the media title, 50% of the duration of the media title, 70% of the duration of the media title, etc.). Those video clips that had the highest number of successful streams may be analyzed for patterns. These patterns may include colors, shapes, objects, positions, actors, actresses, buildings, locations, settings, or any combination of elements or characteristics that would lend that video clip to attract interest for the underlying media item. The VCLM may then note these patterns and apply the patterns when analyzing video clips from the retriever 403 for media item 401.

At least in some cases, the analysis may result in a predicted video clip take fraction value 502 for each video clip, indicating the predicted percentage of likely views per number of impressions. As shown in FIG. 5, for instance, the take fraction value 502 may represent the number of successful streams divided by the number of impressions (e.g., the number of people that viewed the video clip 501). In the example of FIG. 5, the number of successful streams (i.e., plays>15 minutes, in this case) is 10.5K and the number of impressions is 1.8M. This results in a video clip take fraction value 502 of 0.00583.

Returning to FIG. 4, the video clip ranker 404 may calculate a video clip take fraction value for each video clip and then rank the video clips from the highest take fraction value to the lowest take fraction value. This determined take fraction value for video clip 501 may be a prediction based on patterns that are identified by an ML model. As noted above, the number of successful streams may be replaced with the number of likes, the number of shares, the number of repeat viewings, or other indicators of interest in the media item relative to the number of impressions.

After analyzing the video clips 404, the ranker may be configured to rank the video clips based on their calculated take fraction value. In FIG. 4, the video clips are ranked from highest to lowest, with various predicted video clip take fraction values (e.g., 0.9, 0.89, 0.75, 0.74, and 0.71). The ranked video clips may then be provided to the post-processing module 406 for editing or other changes prior to publishing the hook clip online. At least in some cases, it may be advantageous to have different video clips from the same media item to present to different users. Thus, if a user has shown a proclivity in the past to watch films with a certain actor or actress, a video clip with that actor or actress may be the best hook for that media item 401 for that particular user. Other users may be attracted to different aspects of media item 401.

In some cases, the sampler 405 may not only select those video clips that have passed a sensitive content filter and have a highly ranked take fraction, the sampler 405 may also pass random video clips for live playback in the streaming application. Adding occasional random video clips may help to ensure that clips with a low estimated take fraction are, at least at times, presented to users in the chance that they may be better than other clips at enticing views of the underlying media item.

In some cases, the VCLM algorithm may pass the ranked and grouped video clips to one or more human designers who can either accept or reject the video clips as hook clips. The accepted video clips may be passed to the post-processing module 406 for minor edits and/or final review, while rejected video clips may be discarded, potentially along with an indication of why the video clips were not used (e.g., the video clip was not relevant or contained a spoiler about the media item or contained sensitive content, etc.). The accepted and rejected video clips may then be provided to a feedback manager that notes the outcome of each video clip. This information may be implemented by the feedback manager to inform the VCLM algorithm, which can use the video clip acceptances or rejections in its future pattern matching analyses. Thus, the system may continually improve over time and may achieve higher and higher take fraction values for each newly identified video clip.

In some embodiments, the VCLM may be configured to access an unprocessed video clip (e.g., 120 of FIG. 1) that is associated with a new media item 126 that has not been processed by the trained ML model (e.g., the ranker 404 of FIG. 4). The trained ML model may be used to predict a take fraction value 124 for the unprocessed video clip 120 to indicate how well the unprocessed video clip will correlate to user views of the new, unprocessed media item 126. In such cases, when new movies or tv shows are generated and released for public consumption, the VCLM may not know which clips to use to advertise for the new movie or tv show. The VCLM may determine, based on the ML model that was trained by analyzing prior hook clips and associated media items, which clips in the unprocessed video clip 120 are likely to be good at attracting views (i.e., which video clips have a sufficiently high predicted take fraction value).

Once these hook clips have been identified for the unprocessed video clip 120, those hook clips may be implemented to advertise the new media item 126. This usage as a hook clip may be monitored and tracked, as feedback, to determine how well the unprocessed video clip 120 correlates to views of the new media item 126. This feedback may, in turn, be used to improve and update the ML model and may influence the ML model when accessing future video clips and predicting future video clip take fraction values. In at least some embodiments, the ML model may change which hook clips are shown with a specific media item based on the incorporated feedback.

Figure 6:
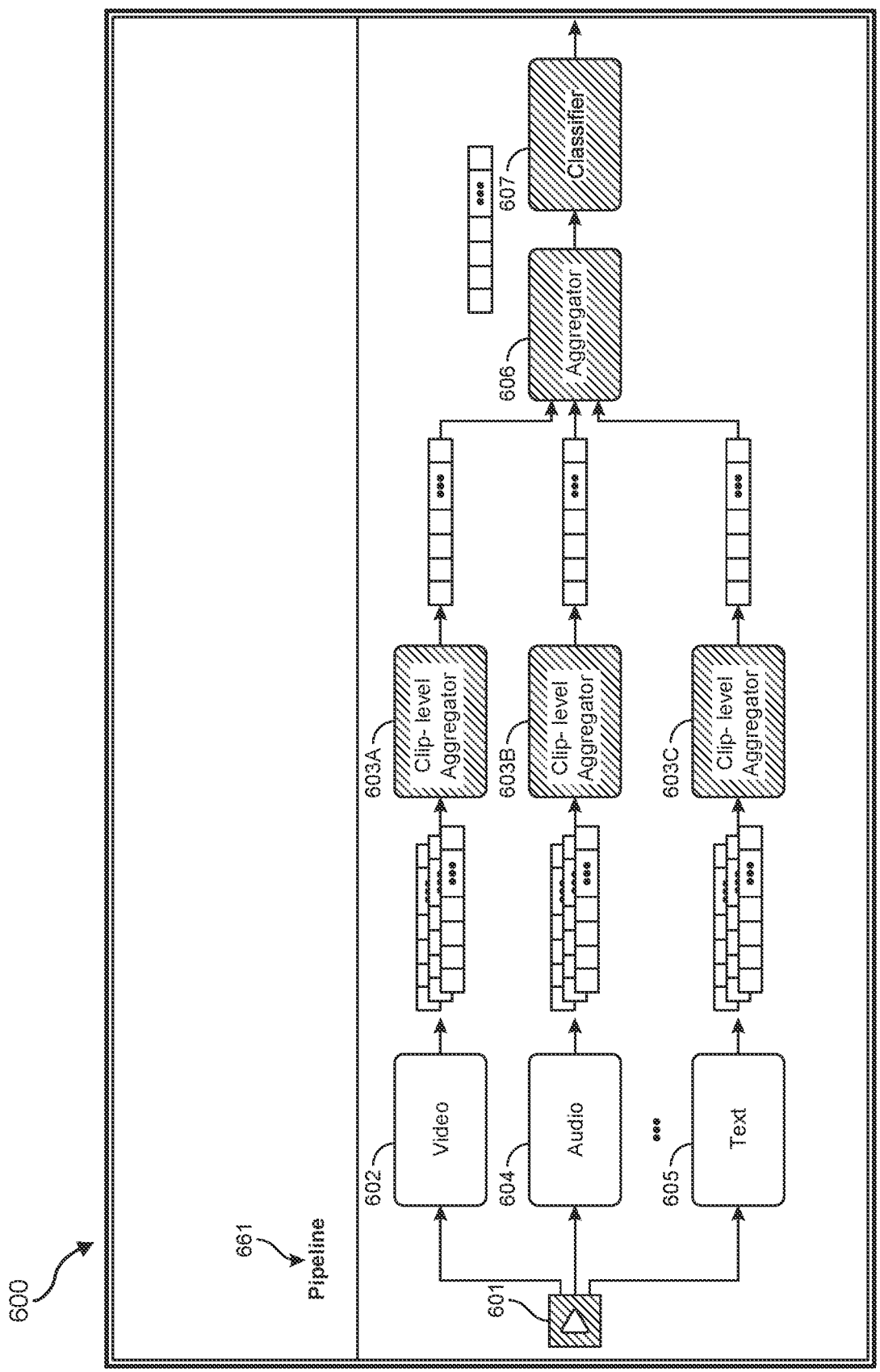
FIG. 6 illustrates a computing architecture in which embodiments of the disclosure may be performed including identifying and implementing audio, video, text, or metadata related to a media item.
Figure 7:
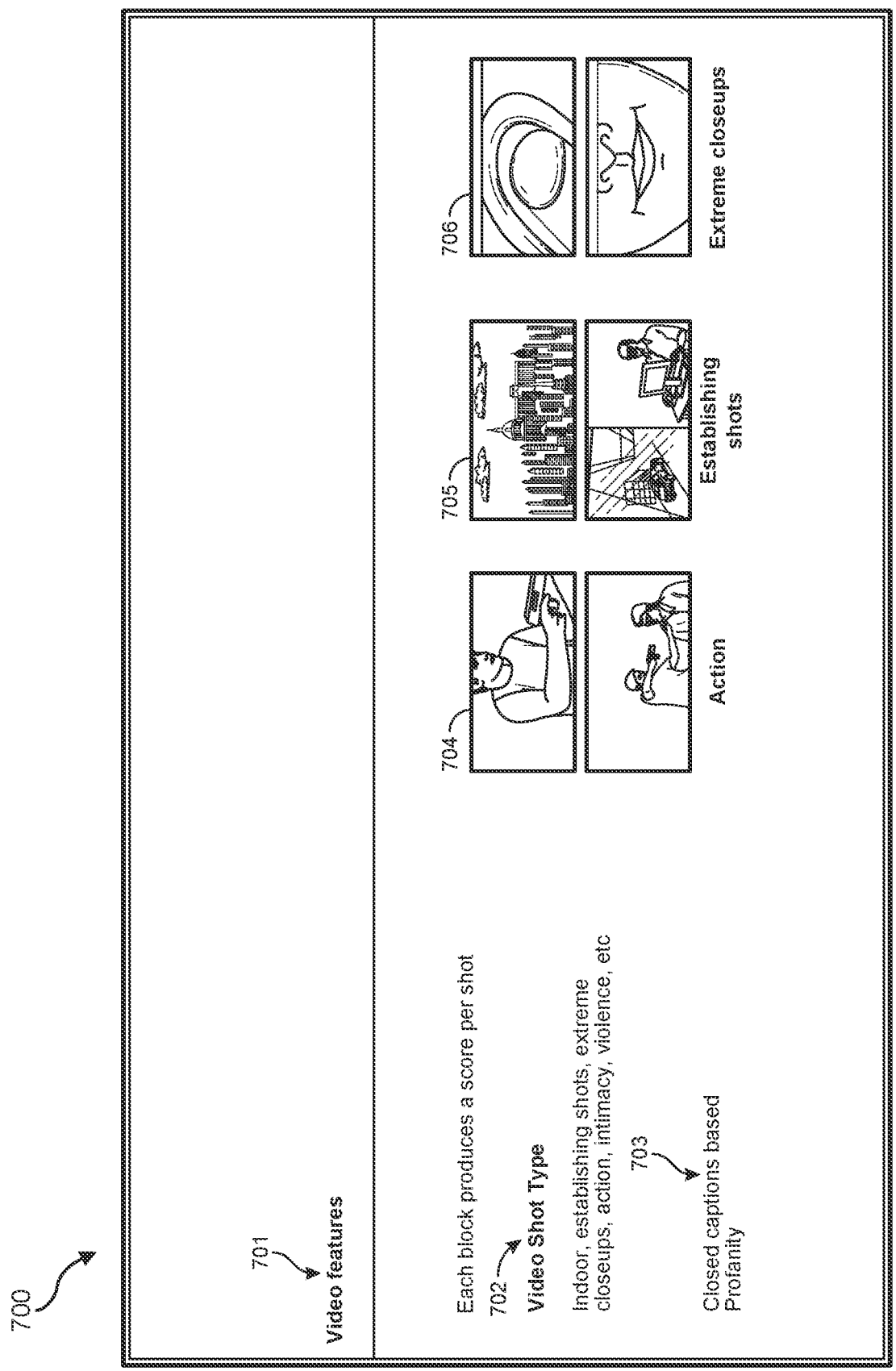
FIG. 7 illustrates an embodiment of various video features that may be identified and implemented in the embodiments herein.

As shown in FIG. 6, various audio, video, or textual characteristics may be used when comparing a video clip to other, previously selected video clips. This process may include implementing a comparison pipeline 661 within computing architecture 600. The comparison pipeline 661 may ingest a media item 601 or video clip and may analyze that media item for patterns or audio/video characteristics that are present in a specific video clip and in one or more previously selected video clips. In some cases, the comparison pipeline 661 may compare video characteristics 602 of a specific clip to other, previously used clips. These video characteristics 602 may include actors or actresses appearing in the clips, locations, scenes, shots, or other characteristics. For instance, as shown in FIG. 7, embodiment 700 illustrates different video features 701 including video shot type 702. Video shot type 702 lists different types of shots including indoor shots, establishing shots (705), extreme closeups (706), action shots (704), or other types of video shots. In some cases, close captions 703 may indicate profanity or other adult language that would likely prohibit the clip from being used as a hook clip.

Additionally or alternatively, the comparison pipeline 661 may determine whether a specified video clip includes audio characteristics 604 that are similar to other, previously used hook clips. These audio characteristics 604 may include indications of people talking, periods of silence, explosions, car chases, gun fights, serene music, or other audio indicators. Still further, the text characteristics 605 may include metadata describing genre, actors, directors, time periods, themes, A/V formats, close captions, or other information. Any or all of this metadata information may be used by the comparison pipeline 661 to compare and identify similar video clips. Individual aggregators (e.g., 603A, 603B, 603C) may be implemented to select video clips determined to be similar on those individual bases (e.g., video, audio, text, respectively). Those video clips may then be provided to a centralized aggregator 606 and a classifier 607 that provides indicators, identifiers, or classifications to the resulting hook clips. These identifiers may then be used to determine which hook clips are surfaced to specific users based on personalization algorithms.

In some embodiments, video clips may be edited before being published as hook clips. In some cases, this editing may be minor, while in other cases, the editing may be more involved, resulting in multiple changes. In such cases, edited versions of the video clip may result in different video clip take fraction values for the associated media item (as opposed to a non-edited version of the video clip). In such cases, the ML model may be configured to process the edited versions of the video clip as separate video clips or separate versions of the video clip that are each associated with that media item. Any of these different versions may be surfaced when a user shows interest in the media item. For some edited video clips where the length of the clip has been altered, one or more timecodes may be added to or removed from the video clip to adjust the length of the video clip. In cases where a media item has multiple corresponding video clips, a personalized video clip that is chosen specifically for that viewer (e.g., based on preferences or prior viewing history, etc.) may be presented to the user to entice views of the underlying media item. In this manner, personalized hook clips that have been predicted to be successful may be presented to users with greater success to entice those users to view the underlying media item.

In addition to the computer-implemented method described above, a corresponding system may be provided that includes: at least one physical processor and physical memory including computer-executable instructions that, when executed by the physical processor, cause the physical processor to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

Still further, in addition to the computer-implemented method described above, a non-transitory computer-readable medium may be provided that includes computer-executable instructions that, when executed by at least one processor of a computing device, cause the computing device to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

EXAMPLE EMBODIMENTS

Example 1. A computer-implemented method comprising: accessing at least one video clip associated with a media item, comparing the accessed video clip to one or more previously selected video clips that have been used to promote each clips' corresponding media item, upon determining that the accessed video clip is sufficiently similar to at least one specified video clip of the previously selected video clips, accessing a take fraction value associated with the specified video clip that indicates how well the specified video clip has correlated to user views of the associated media item, and based at least on the association between the specified video clip and the take fraction value, training a machine learning (ML) model to predict a video clip take fraction value for the accessed video clip indicating how well the accessed video clip will correlate to user views of the media item.

Example 2. The computer-implemented method of Example 1, further including: accessing an unprocessed video clip associated with a new media item that has not been processed by the trained ML model, and implementing the trained ML model to predict a take fraction value for the unprocessed video clip to indicate how well the unprocessed video clip will correlate to user views of the new, unprocessed media item.

Example 3. The computer-implemented method of Example 1 or Example 2, further including tracking, as feedback, how well the unprocessed video clip correlated to views of the associated media item and incorporating the feedback in the ML model when accessing future video clips and predicting future video clip take fraction values.

Example 4. The computer-implemented method of any of Examples 1-3, further comprising changing a selected video clip for at least one media item based on the incorporated feedback.

Example 5. The computer-implemented method of any of Examples 1-4, wherein comparing the accessed video clip to one or more previously selected video clips includes identifying and matching patterns or audio/video characteristics that are present in the accessed video clip and in the previously selected video clips.

Example 6. The computer-implemented method of any of Examples 1-5, further comprising filtering video clips that are to be processed by the ML model to ensure that the video clips are usable by the ML model.

Example 7. The computer-implemented method of any of Examples 1-6, wherein the video clip take fraction value indicates a percentage of views of the associated media item relative to a number of impressions of the accessed video clip.

Example 8. The computer-implemented method of any of Examples 1-7, wherein the ML model comprises a deep learning model that is configured to analyze a plurality of video clips and a corresponding plurality of video clip take fraction values to indicate how well the plurality of video clips correlates to views of the associated media items.

Example 9. The computer-implemented method of any of Examples 1-8, further comprising ranking each of the plurality of video clips based on the predicted video clip take fraction values.

Example 10. The computer-implemented method of any of Examples 1-9, wherein the video clip take fraction value includes, as a factor, an amount of time spent watching the media item.

Example 11. The computer-implemented method of any of Examples 1-10, wherein the video clip take fraction value includes, as a factor, a property associated with the media item.

Example 12. The computer-implemented method of any of Examples 1-11, wherein edited versions of the accessed video clip result in different video clip take fraction values for the associated media item.

Example 13. The computer-implemented method of any of Examples 1-12, wherein the ML model is configured to process the edited versions of the accessed video clip as separate video clips that are each associated with the media item.

Example 14. A system comprising: at least one physical processor; and physical memory comprising computer-executable instructions that, when executed by the physical processor, cause the physical processor to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

Example 15. The system of Example 14, further comprising adding one or more timecodes to the accessed video clip to adjust the length of the video clip.

Example 16. The system of Example 14 or Example 15, wherein the accessed video clip includes at least one or a scene or a shot determined by respective scene boundaries or shot boundaries.

Example 17. The system of any of Examples 14-16, wherein the accessed media item has a plurality of corresponding video clips, and wherein a personalized video clip is presented to a user to entice views of the media item.

Example 18. The system of any of Examples 14-17, wherein a plurality of video clips are stitched together to provide a single, longer video clip.

Example 19. The system of any of Examples 14-18, wherein a random video clip is selected over a highly ranked video clip for presentation to a user.

Example 20. A non-transitory computer-readable medium comprising one or more computer-executable instructions that, when executed by at least one processor of a computing device, cause the computing device to: access at least one video clip associated with a media item, compare the accessed video clip to one or more previously selected video clips that have been used to promote each clips' corresponding media item, upon determining that the accessed video clip is sufficiently similar to at least one specified video clip of the previously selected video clips, access a take fraction value associated with the specified video clip that indicates how well the specified video clip has correlated to user views of the associated media item, and based at least on the association between the specified video clip and the take fraction value, train a machine learning (ML) model to predict a video clip take fraction value for the accessed video clip indicating how well the accessed video clip will correlate to user views of the media item.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing at least one video clip associated with a media item;
   comparing the accessed video clip to one or more previously selected video clips that have been used to promote each clips' corresponding media item;
   upon determining that the accessed video clip is sufficiently similar to at least one specified video clip of the previously selected video clips, accessing a take fraction value associated with the specified video clip that indicates how well the specified video clip has correlated to user views of the associated media item; and
   based at least on the association between the specified video clip and the take fraction value, training a machine learning (ML) model to predict a video clip take fraction value for the accessed video clip indicating how well the accessed video clip will correlate to user views of the media item.

2. The computer-implemented method of claim 1, further comprising:
   accessing an unprocessed video clip associated with a new media item that has not been processed by the trained ML model; and
   implementing the trained ML model to predict a take fraction value for the unprocessed video clip to indicate how well the unprocessed video clip will correlate to user views of the new, unprocessed media item.

3. The computer-implemented method of claim 2, further comprising:
   tracking, as feedback, how well the unprocessed video clip correlated to views of the associated media item; and
   incorporating the feedback in the ML model when accessing future video clips and predicting future video clip take fraction values.

4. The computer-implemented method of claim 3, further comprising changing a selected video clip for at least one media item based on the incorporated feedback.

5. The computer-implemented method of claim 1, wherein comparing the accessed video clip to one or more previously selected video clips includes identifying and matching patterns or audio/video characteristics that are present in the accessed video clip and in the previously selected video clips.

6. The computer-implemented method of claim 1, further comprising filtering video clips that are to be processed by the ML model to ensure that the video clips are usable by the ML model.

7. The computer-implemented method of claim 1, wherein the video clip take fraction value indicates a percentage of views of the associated media item relative to a number of impressions of the accessed video clip.

8. The computer-implemented method of claim 1, wherein the ML model comprises a deep learning model that is configured to analyze a plurality of video clips and a corresponding plurality of video clip take fraction values to indicate how well the plurality of video clips correlates to views of the associated media items.

9. The computer-implemented method of claim 8, further comprising ranking each of the plurality of video clips based on the predicted video clip take fraction values.

10. The computer-implemented method of claim 1, wherein the video clip take fraction value includes, as a factor, an amount of time spent watching the media item.

11. The computer-implemented method of claim 1, wherein the video clip take fraction value includes, as a factor, a property associated with the media item.

12. The computer-implemented method of claim 1, wherein edited versions of the accessed video clip result in different video clip take fraction values for the associated media item.

13. The computer-implemented method of claim 12, wherein the ML model is configured to process the edited versions of the accessed video clip as separate video clips that are each associated with the media item.

14. A system comprising:
   at least one physical processor; and
   physical memory comprising computer-executable instructions that, when executed by the physical processor, cause the physical processor to:
      access at least one video clip associated with a media item;
      compare the accessed video clip to one or more previously selected video clips that have been used to promote each clips' corresponding media item;
      upon determining that the accessed video clip is sufficiently similar to at least one specified video clip of the previously selected video clips, access a take fraction value associated with the specified video clip that indicates how well the specified video clip has correlated to user views of the associated media item; and
      based at least on the association between the specified video clip and the take fraction value, train a machine learning (ML) model to predict a video clip take fraction value for the accessed video clip indicating how well the accessed video clip will correlate to user views of the media item.

15. The system of claim 14, further comprising adding one or more timecodes to the accessed video clip to adjust the length of the video clip.

16. The system of claim 14, wherein the accessed video clip includes at least one or a scene or a shot determined by respective scene boundaries or shot boundaries.

17. The system of claim 14, wherein the accessed media item has a plurality of corresponding video clips, and wherein a personalized video clip is presented to a user to entice views of the media item.

18. The system of claim 14, wherein a plurality of video clips are stitched together to provide a single, longer video clip.

19. The system of claim 14, wherein a random video clip is selected over a highly ranked video clip for presentation to a user.

20. A non-transitory computer-readable medium comprising one or more computer-executable instructions that, when executed by at least one processor of a computing device, cause the computing device to:
- access at least one video clip associated with a media item;
- compare the accessed video clip to one or more previously selected video clips that have been used to promote each clips' corresponding media item;
- upon determining that the accessed video clip is sufficiently similar to at least one specified video clip of the previously selected video clips, access a take fraction value associated with the specified video clip that indicates how well the specified video clip has correlated to user views of the associated media item; and
- based at least on the association between the specified video clip and the take fraction value, train a machine learning (ML) model to predict a video clip take fraction value for the accessed video clip indicating how well the accessed video clip will correlate to user views of the media item.

* * * * *